United States Patent [19]

Yokoyama

[11] Patent Number: 5,134,498
[45] Date of Patent: Jul. 28, 1992

[54] APPARATUS FOR CONTROLLING THE TIME BASE OF A VIDEO SIGNAL

[75] Inventor: Eiichi Yokoyama, Tokyo, Japan
[73] Assignee: Sony Corporation, Tokyo, Japan
[21] Appl. No.: 526,011
[22] Filed: May 21, 1990
[30] Foreign Application Priority Data May 31, 1989 [JP] Japan ................................. 1-138145

[51] Int. Cl.⁵ .............................................. H04N 5/76
[52] U.S. Cl. ................................. 358/337; 358/319; 358/320; 360/36.1
[58] Field of Search ............... 358/337, 310, 320, 324, 358/335, 182, 183, 319; 360/36.1, 36.2

[56] References Cited

U.S. PATENT DOCUMENTS

| | | | |
|---|---|---|---|
| 4,498,103 | 2/1985 | Aschwanden | 358/319 |
| 4,688,081 | 8/1987 | Furuhata et al. | 358/337 |
| 4,802,025 | 1/1989 | Shinada | 358/337 |
| 4,841,379 | 6/1989 | Akiyama | 358/337 |
| 4,947,264 | 8/1990 | Narusawa | 358/337 |
| 4,987,491 | 1/1991 | Kaite et al. | 358/337 |
| 5,010,417 | 4/1991 | Yoshio et al. | 358/335 |
| 5,032,926 | 7/1991 | Imai et al. | 358/335 |

Primary Examiner—Roy N. Envall, Jr.
Assistant Examiner—Khoi Truong
Attorney, Agent, or Firm—Alvin Sinderbrand; William S. Frommer

[57] ABSTRACT

An apparatus for controlling the time base of a first video signal, for example, from a character signal generator, to be superimposed on a second video signal reproduced from a record medium, as by a VTR, and having a time base which is fluctuating, includes a detector for detecting time base fluctuations of the second video signal and producing an output signal representing the time base fluctuations, and a time base control circuit for controlling the time base of the first video signal on the basis of the output signal from the detector, such that the time base of the first video signal is correlated to the time base fluctuations of the second video signal.

7 Claims, 2 Drawing Sheets

APPARATUS FOR CONTROLLING THE TIME BASE OF A VIDEO SIGNAL

BACKGROUND OF THE INVENTION

1. Field of the Invention

The present invention relates generally to an apparatus for controlling the time base of a video signal and, more particularly, is applicable to the control of the time base of a video signal recorded intermittently by a video tape recorder in performing surveillance or the like.

2. Description of the Prior Art

Video tape recorders are known which are suitable for making intermittent recordings, for example, in conducting surveillance for security purposes. In its recording mode, this video tape recorder (VTR) serves to record a single frame of a video image at a given time while the magnetic recording tape in the recorder is held stationary. Once this is accomplished, the tape is advanced to a new position where it is likewise held stationary for a predetermined time interval after which a single frame of a subsequent image is recorded. This intermittent recording process enables the VTR to record events over a substantially longer time period than a similar recorder operating in a continuous recording mode.

Japanese Laid Open Patent Gazette No. 63-133,339 describes such an intermittent recording VTR which is operative, in its reproducing mode, to transport a magnetic recording tape continuously to review images that have been recorded thereon. Once a desired picture is located in the course of such review, it can be observed more fully by carrying out a so-called frame playback of the picture. In the use of such intermittent recording VTR, the pictures reproduced in the continuous playback mode should be as free of noise as possible. In addition, the intermittent recording VTR should be compatible with standard video tape recorders and adjustments required in the course of manufacturing the intermittent recording VTR should be easy to make.

Accordingly, a VTR to meet these objectives is set forth in Japanese Patent Application No. 62-204,498, which has been assigned to the assignee of the instant application. This VTR employs a pair of rotary magnetic heads having differing azimuth angles and which are spaced apart in the direction of the axis of rotation by a predetermined step difference. In its recording mode, such intermittent recording VTR is operative to record a single video frame on a stationary magnetic tape, together with a plurality of pilot signals to assist tracking in the playback mode. In continuous playback, the pilot signals assist each head to scan a corresponding track to reproduce a field of the recorded image which is then stored in memory. This permits the VTR to carry out suitable signal processing to compensate for drop-outs of the reproduced signal resulting from the failure of the head to scan the corresponding track precisely. As thus processed, each field reproduced by one head is read-out from the memory as the next succeeding field is being scanned by the other head. In this manner, a continuously reproduced picture is provided having substantially reduced noise especially near the upper and lower extremes of the picture where tracking is normally poorest in the continuous playback mode.

In order to assist in locating any particular recorded images which it is desired to review, respective alarm numbers, together with the recording date and/or time, are assigned to each image and data signals representing this information are recorded therewith. When each image is reproduced subsequently, the data signals are utilized by a computer to control the production by a character generator of corresponding character images representing the alarm number and date and/or time. These character images are then displayed on a monitor screen together with the respective recorded picture. In the exemplary illustration of FIG. 1, a number display area RN and a date and/or time display area RT are defined on a monitor screen P, wherein the alarm number and the date and/or time of the observed image are displayed on every reproduced picture with the use of a character generator controlled by a computer.

The time base of a video signal reproduced by a video tape recorder fluctuates, so that the reproduced video signal exhibits unavoidable and undesirable movement or jitter due to a jitter signal component of the video signal resulting from such fluctuations. However, the character generator is arranged to produce video character signals according to the standards of the original video signal, so that these video character signals do not possess the jitter signal component of the reproduced video signal.

Accordingly, when the reproduced video signal and the video character signals are combined without signal processing to remove the undesirable consequences of the jitter signal component in the reproduced video signal, the character displayed as a result of the video character signal (FIG. 2) appears to exhibit distortion in the horizontal direction of the picture by reason of its contrast with the reproduced video signal having a jitter signal component and/or the reproduced video signal exhibits increased or more apparent jitter by reason of its contrast with the displayed character which is generated without a jitter signal component.

Although the jitter signal component of the reproduced video signal can be minimized or removed with the use of a time base corrector, the reproduced video signal includes a large amount of information. Consequently, such a time base corrector requires large scale circuitry which is undesirably complicated and expensive.

OBJECTS AND SUMMARY OF THE INVENTION

Accordingly, it is a general object of the present invention to provide an improved apparatus for controlling the time base of a video signal in which the above-described disadvantages can be substantially avoided.

It is a further object of the present invention to provide an apparatus for controlling the time base of a video signal, for example, corresponding to a character or figure, which is superimposed on a video signal reproduced with a jitter signal component so that any distortion resulting from such jitter, or at least the noticeability thereof, is substantially reduced by means of relatively simple and inexpensive circuitry.

It is another object of the present invention to provide an apparatus, as aforesaid, for controlling the time base of a video signal for use with a video tape recorder performing surveillance or other intermittent recording operations.

In accordance with an aspect of the invention, in an apparatus for controlling the time base of a first video signal to be superimposed on a second video signal reproduced from a record medium and having a fluctuating time base, the apparatus comprises a time base fluctuation detecting means for detecting time base fluctuations of the second video signal and producing an output signal representing such time base fluctuations, and a time base control means for controlling the time base of the first video signal on the basis of the output signal from the time base fluctuation detecting means, such that the time base of the first video signal is correlated to the time base fluctuations of the second video signal. Accordingly, distortion of a character or pattern superimposed on a reproduced video signal resulting from the presence of a jitter signal component in the latter and/or the noticeability of the jitter in the displayed video signal can be substantially reduced with the use of a comparatively simple apparatus.

The above, and other objects, features and advantages of the invention, will be apparent in the following detailed description of an illustrative embodiment which is to be read in connection with the accompanying drawings forming a part hereof.

DETAILED DESCRIPTION OF A PREFERRED EMBODIMENT

Figure 1:
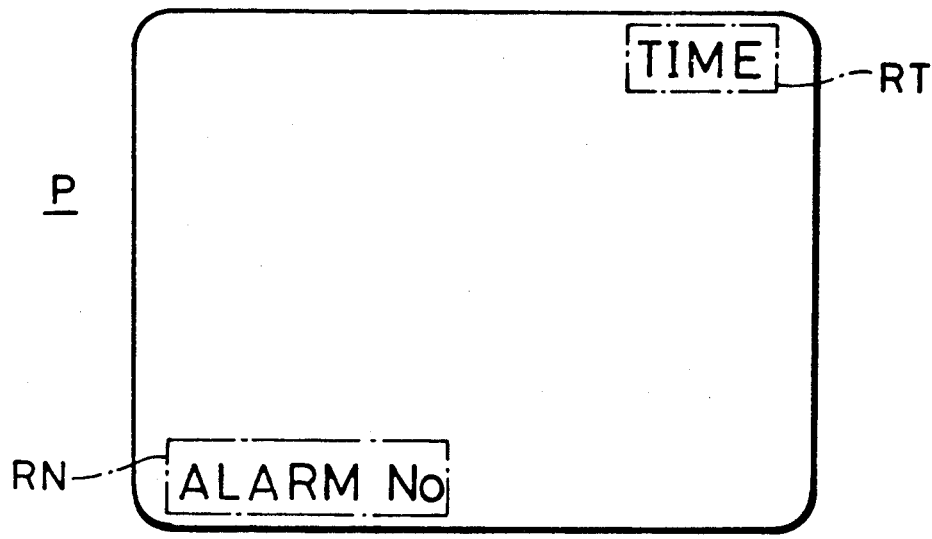
FIG. 1 is an exemplary illustration of a picture reproduced on a screen of a monitor wherein an alarm number and picture date and/or time have been inserted by superimposing signals produced by a character generator on a reproduced video signal.
Figure 2:
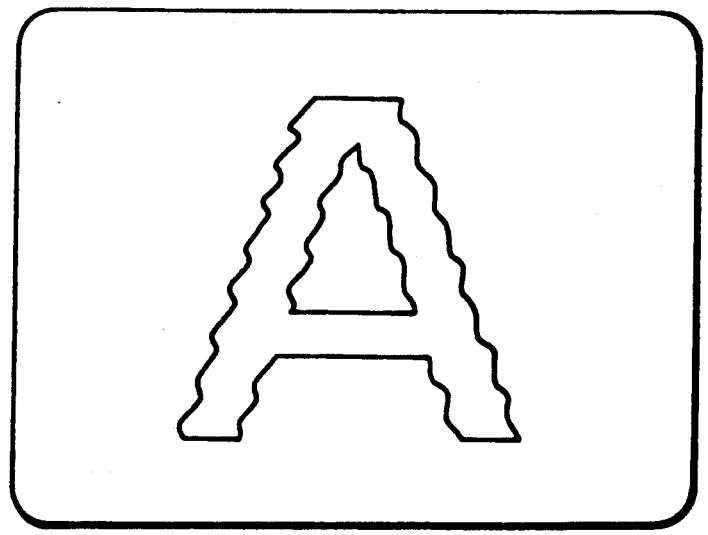
FIG. 2 is an exemplary illustration of a video image produced by superimposing signals from a character generator having a fixed time base on a video signal reproduced by a video tape recorder and having a fluctuating time base.
Figure 3:
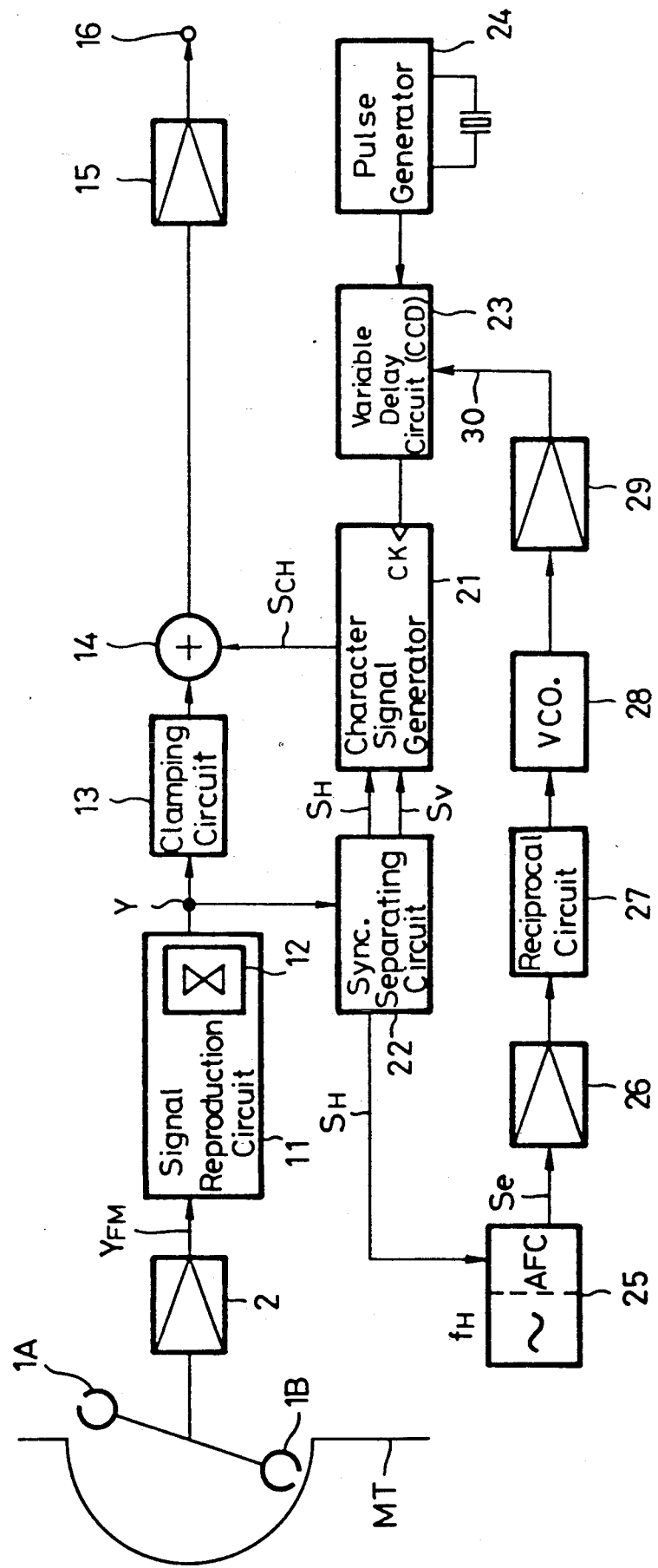
FIG. 3 is a block diagram illustrating an apparatus for controlling the time base of a video signal in accordance with one embodiment of the present invention.

Referring to FIG. 3 in detail, it will be seen that, in a reproducing circuit arrangement of a VTR in accordance with an embodiment of the present invention, a pair of magnetic heads 1A and 1B, are provided for alternately scanning a video recording tape MT on which video signals are recorded magnetically as frequency modulated (FM) radio frequency signals. In the embodiment of FIG. 3, the magnetic heads 1A and 1B serve to reproduce a frequency modulated luminance signal and are coupled with the input of a pre-amplifier 2 from which an amplified luminance signal $Y_{FM}$ is output to a signal reproduction circuit 11 which is operative to frequency demodulate the signal $Y_{FM}$ by means of an FM demodulator 12 thereof. The demodulated luminance signal Y from the FM demodulator 12 is supplied to a clamping circuit 13 and the output therefrom is provided to a first summing input terminal of an adding circuit 14. An output terminal of the adding circuit 14 is coupled through an amplifier 15 to an output terminal 16 of the reproducing circuit arrangement.

The reproducing circuit arrangement of FIG. 3 also includes a character signal generator 21 for producing character or pattern signals $S_{HC}$ at an output thereof which is coupled with a second summing input of the adding circuit 14 for superimposing the character or pattern signals $S_{CH}$ on the reproduced luminance signal Y such that the reproduced signal Y having the character or pattern signals SCH superimposed thereon is supplied through the amplifier 15 to the output terminal 16 of the reproducing circuit arrangement.

A synchronizing separator circuit 22 has an input coupled with the output of the signal reproduction circuit 11 to receive the reproduced luminance signal Y and is operative to separate therefrom a horizontal synchronizing signal $S_H$ and a vertical synchronizing signal $S_V$. The synchronizing separating circuit 22 is coupled with the character signal generator 21 to supply both the horizontal synchronizing signal $S_H$ and the vertical synchronizing signal $S_V$ thereto. A pulse generator 24 is operative to output a clock signal to the input of a variable delay circuit 23 desirably comprised of a charge coupled device (CCD). The clock signal from the pulse generator is controllably delayed by the CCD 23 in accordance with a signal received at a control terminal 30 thereof, and the controllably delayed clock signal from the CCD 23 is applied to a clock input terminal CK of the character signal generator 21.

As is also shown in FIG. 3, an automatic frequency control (AFC) circuit 25 is coupled with the synchronizing separating circuit 22 to receive the horizontal synchronizing signal $S_H$ therefrom. The AFC circuit 25 includes an oscillator operative to produce a reference oscillation signal $f_H$. The AFC circuit 25 compares the horizontal synchronizing signal $S_H$ with the oscillation signal $f_H$ and produces an error signal $S_e$ corresponding to the difference in frequency between the horizontal synchronizing signal $S_H$ and the reference oscillation signal $f_H$. The error signal $S_e$ is supplied by the AFC circuit 25 to an output thereof coupled through an amplifier 26 to the input of a reciprocal circuit 27. An output of the reciprocal circuit 27 is supplied to a control input of a voltage controlled oscillator (VCO) 28 which is operative to supply an oscillating output signal having its period controlled by the signal input from the reciprocal circuit 27. The output of the VCO 28 is coupled through a drive amplifier 29 to the control input 30 of the CCD 23.

The circuit arrangement of FIG. 3 operates as follows: The frequency of the oscillation signal $f_H$ produced by the AFC circuit 25 is a constant value equal to a normal horizontal line sweep frequency, such as, that of the luminance signal Y before it is recorded on, and reproduced from the tape MT. Accordingly, when the reproduced luminance signal Y has no jitter component, the frequency of the horizontal synchronizing signal $S_H$ supplied to the AFC circuit 25 equals the frequency of the oscillation signal $f_H$, and hence the error signal $S_e$ from the AFC circuit 25 is at zero level. In response to the corresponding value of the output from reciprocal circuit 27, the period or cycle of the oscillating output signal of the VCO 28 is then a predetermined value $T_{28}(0)$ of, for example, 100 nanoseconds. In response thereto, the CCD 23 acts as a delay circuit having a delay time $T_{23}(0)$ corresponding to a pulse having a period of $T_{26}(0)$. Accordingly, the output of the pulse generator 24 is supplied to the clock input terminal CK of the character signal generator 21 in a constant phase condition.

When the reproduced luminance signal Y has a jitter signal component such that the frequency of the horizontal synchronizing signal $S_H$ supplied to the AFC circuit 25 is increased above that of the oscillation signal frequency $f_H$ by the amount $\Delta f$, the error signal $S_e$ derived from the AFC circuit 25 becomes, for example, a positive level signal. The positive level error signal $S_e$ is converted to a corresponding reciprocal value by the reciprocal circuit 27 so as to obtain a cycle or period difference signal $\Delta T$ therefrom corresponding to the above-described frequency error Δf. The period difference signal ΔT is supplied to the VCO 28 so that the period of the output signal therefrom is decreased to a value $T_{28}(-)$ which is shorter than the predetermined value $T_{28}(0)$ by ΔT, whereby the CCD 23 acts as a delay circuit having a relatively short delay time $T_{23}(-)$ corresponding to a pulse having a period of $T_{28}(-)$. Accordingly, the output of the pulse generator 24 is supplied to the clock input terminal CK of the character signal generator 21 in an advanced phase condition, so that the output signal $S_{CH}$ thereof is correlated with a positive fluctuation in the frequency of the horizontal synchronizing signal $S_H$ of the reproduced luminance signal Y.

When the frequency of the horizontal synchronizing signal $S_H$ supplied to the AFC circuit 25 becomes lower than the oscillation signal frequency $f_H$ by the amount Δf due to the presence of a jitter component in the reproduced luminance signal Y, the error signal $S_e$ produced by the AFC circuit 25 becomes, for example, negative in level, whereby the period of the output signal from the VCO 28 is conversely increased above the predetermined value $T_{28}(0)$ by an amount of time equal to ΔT. Thus, a phase delayed clock signal is supplied to the character signal generator 21 by the CCD 23 so that the output signal $S_{CH}$ of the character signal generator 21 is correlated with a negative fluctuation in the frequency of the horizontal synchronizing signal $S_H$ of the reproduced luminance signal Y.

Accordingly, in the embodiment of the present invention described above in connection with FIG. 3, a jitter signal component of the reproduced video signal Y is detected by the AFC circuit 25 and the phase of the clock signal supplied to the character signal generator 21 is modulated by selectably varying the delay thereof produced by the CCD 23 on the basis of the output of the AFC circuit 25 so that correlation between the timing of the output of the character signal generator 21 and the jitter signal component of the reproduced video signal Y is maintained. In this manner, horizontal distortion of the character or pattern produced by the character signal generator 21 is substantially removed, particularly relative to the video signal on which the character or pattern is to be superimposed.

Furthermore, since the jitter component of the reproduced video signal need not be eliminated by the apparatus of the present invention, its circuit scale is relatively small compared with conventional jitter compensation devices which are intended to eliminate jitter. Accordingly, the apparatus of the present invention is relatively inexpensive to construct.

Although a specific embodiment of the invention has been described in detail herein with reference to the accompanying drawings, it is to be understood that the invention is not limited to that precise embodiment and that various changes and modifications may be effected therein by one skilled in the art without departing from the spirit or scope of the invention as defined in the appended claims.

What is claimed is:

1. An apparatus for controlling the time base of generated character data to be superimposed on a video signal reproduced from a record medium, and having a time base which is fluctuating, said apparatus comprising:

time base fluctuation detecting means for detecting time base fluctuations of said video signal and producing an output signal representing said time base fluctuations; and time base control means for controlling the time base of said generated character data on the basis of the output signal from said time base fluctuation detecting means, such that the time base of said generated character data is correlated to the time base fluctuations of the video signal.

2. The apparatus according to claim 1, wherein said time base fluctuation detecting means includes means for detecting time base fluctuations of a horizontal synchronizing signal of said video signal.

3. The apparatus according to claim 2, wherein said means for detecting time base fluctuations of the horizontal synchronizing signal comprises means for producing a reference signal; and means for comparing said horizontal synchronizing signal with said reference signal and producing an error signal representing a difference in frequency between said horizontal synchronizing signal and said reference signal; and wherein said time base control means includes means for producing a clock signal whose phase is correlated to said error signal.

4. The apparatus according to claim 3, wherein said means for producing a clock signal includes variable delay means for varying the phase of the clock signal on the basis of said error signal.

5. The apparatus according to claim 1, further comprising character signal generator means for providing said generated character data.

6. The apparatus according to claim 5, wherein said time base control means is operative to control the time base of said character data generated by the character signal generator means and includes means for supplying a variable clock signal to said character signal generator means.

7. The apparatus according to claim 6, wherein said time base fluctuation detecting means includes comparator means for comparing the frequency of a horizontal synchronizing signal of said video signal with the frequency of a reference signal to produce an error signal representing the difference in frequency between said horizontal synchronizing signal and said reference signal; and wherein said time base control means further includes clock signal delay means responsive to said error signal for adjusting the phase of said clock signal supplied to the character signal generator means.

* * * * *